(12) United States Patent
Inoue

(10) Patent No.: US 8,651,436 B2
(45) Date of Patent: Feb. 18, 2014

(54) HOLDING DEVICE

(75) Inventor: Yasuhiko Inoue, Yokohama (JP)

(73) Assignee: Nifco Inc., Yokohama-Shi (JP)

(*) Notice: Subject to any disclaimer, the term of this patent is extended or adjusted under 35 U.S.C. 154(b) by 284 days.

(21) Appl. No.: 13/317,742

(22) Filed: Oct. 27, 2011

(65) Prior Publication Data

US 2012/0104212 A1    May 3, 2012

(30) Foreign Application Priority Data

Nov. 2, 2010   (JP) ................. 2010-246543

(51) Int. Cl.
*F16L 3/08* (2006.01)

(52) U.S. Cl.
USPC ........... 248/74.2; 248/49; 248/58; 248/62; 248/63; 248/65; 248/68.1; 248/73; 248/74.1; 248/316.1; 248/292.12; 24/132 R; 24/591.1; 24/592.11; 269/149; 269/249

(58) Field of Classification Search
USPC ........... 248/49, 58, 60, 62, 63, 65, 68.1, 73, 248/74.1, 74.2, 229.13, 229.23, 228.4, 248/230.4, 231.51, 316.1, 316.7, 689, 248/292.12, 220.21, 220.22, 221.11, 248/222.11, 228.6, 228.8, 230.7, 230.8, 248/231.81; 24/16 PB, 17 A, 17 AP, 17 B, 26, 24/27, 19, 132 R, 591.1, 592.11; 403/110, 403/187–201, 234–236, 256–261, 338, 403/373; 269/3, 6, 149, 249, 95; 256/47, 256/54–56

See application file for complete search history.

(56) References Cited

U.S. PATENT DOCUMENTS

| | | | | |
|---|---|---|---|---|
| 4,128,220 A * | 12/1978 | McNeel | ............... | 248/60 |
| 4,213,589 A * | 7/1980 | Pierron et al. | ............... | 248/74.1 |
| 5,280,866 A * | 1/1994 | Ueki | ............... | 248/74.2 |
| 5,305,978 A * | 4/1994 | Current | ............... | 248/230.4 |
| 6,089,556 A * | 7/2000 | Whiteford | ............... | 269/149 |
| 7,674,983 B2 * | 3/2010 | Nakamura | ............... | 174/168 |
| 7,805,814 B2 * | 10/2010 | Cho | ............... | 24/16 PB |
| 8,132,764 B2 * | 3/2012 | Kuipers | ............... | 248/74.3 |
| 2007/0163309 A1 * | 7/2007 | Fawcett et al. | ............... | 70/57.1 |
| 2008/0054153 A1 * | 3/2008 | Soehnholz et al. | ............... | 248/645 |
| 2010/0060460 A1 * | 3/2010 | Zinner | ............... | 340/572.9 |
| 2010/0135716 A1 * | 6/2010 | Shalaby | ............... | 403/110 |

FOREIGN PATENT DOCUMENTS

| | | |
|---|---|---|
| JP | U-H02-27763 | 2/1990 |
| JP | U-H07-35178 | 6/1995 |

* cited by examiner

*Primary Examiner* — Terrell McKinnon
*Assistant Examiner* — Michael McDuffie
(74) *Attorney, Agent, or Firm* — Manabu Kanesaka

(57) ABSTRACT

A holding device has an elastic locking piece having an extending part extending to the outside from a locking claw part. The contact part of an unlocking operating piece contacts the outside of the extending part to reduce the unlocking force of the unlocking operating piece. A sawtooth-form part is in a locked state when a locking piece of an elastic locking piece enters the sawtooth-form part. The elastic locking piece has the extending part extending outside from the locking claw part. The unlocking operating piece has a contact part for contacting with the extending part. The contact part contacts the outside of the extending part when the unlocking operating piece is pressed, the locking claw part of the elastic locking piece is ejected from the indented part of the sawtooth-form part by the contact, and the locked state between the sawtooth-form part and the locking claw part is unlocked.

7 Claims, 15 Drawing Sheets

HOLDING DEVICE

TECHNOLOGICAL FIELD

This invention relates to a holding device for holding a part, for example, a cable clamp for holding a cable. An extending part extending to the outside from a locking claw part is provided on an elastic locking piece, and a contact part of an unlocking operating piece is brought into contact with the extending part from the outside, whereby an unlocking force on the unlocking operating piece can be reduced.

BACKGROUND TECHNOLOGY

There is conventionally known a buckle, comprising a locking piece to be elastically urged toward an indented part of a sawtooth-form part (locking groove) of a belt, and an operating piece (operating part) to contact a tapered part on an end part of the locking piece (see, for example, Patent Document 1, pages 17 to 38 and FIGS. 1 to 5).

Also, there is conventionally known a cable holding device, in which a claw part for locking to an indented part of a sawtooth-form part (locking claw) of a band is provided on one end part of an elastic claw part to be elastically urged toward the aforementioned indented part, and an operable extending part is provided on the other end part (see, for example, Patent Document 1, page 3, left column (column 3), lines 42 to 50, and FIGS. 1, 2, and 5).

PRIOR ART DOCUMENTS

Patent Documents

[Prior Art Document 1] Japanese Examined Utility Model Publication No. H2-27763
[Prior Art Document 2] Japanese Examined Utility Model Publication No. H7-35178

Problems to be Solved by the Invention

However, the abovementioned conventional buckle (Japanese Examined Utility Model Publication No. H2-27763) had a problem that a comparatively great unlocking force for operating the operating piece (operating part) was required because the tapered part was on the end part of the locking piece.

Also, the abovementioned conventional cable holding device (Japanese Unexamined Utility Model Publication No. H7-35178) had a problem that a comparatively great unlocking force for operating the extending part for operation was required because the claw part for locking to the indented part and the extending part for operation were provided on the two end parts of the elastic claw.

Each invention respectively described in each claim is therefore created in consideration of the problems of the abovementioned conventional technologies, and objects thereof are as follow.

An object of the invention according to the first aspect is as follows.

Specifically, the invention according to the first aspect is created in order to be able to reduce the unlocking force on an unlocking operating piece, by providing an extending part extending to the outside from a locking claw part on an elastic locking piece, and bringing a contact part of the unlocking operating piece into contact with the extending part from the outside.

An object of the invention according to the second aspect is as follows, in addition to the abovementioned object of the invention according to the first aspect.

Specifically, the invention according to the second aspect is created in order to be able to further reduce the unlocking force on the unlocking operating piece, by rendering at least one of either the extending part of the locking claw part or the contact part of the unlocking operating piece as an inclined surface.

An object of the invention according to the third aspect is as follows, in addition to the abovementioned object of the invention according to the first aspect.

Specifically, the invention according to the third aspect is created in order to be able to further reduce the unlocking force on the unlocking operating piece, by rendering at least one of either the extending part of the locking claw part or the contact part of the unlocking operating piece as a curved surface.

An object of the invention according to the fourth aspect is as follows, in addition to the abovementioned object of the invention according to any of the first to third aspects.

Specifically, the invention according to the fourth aspect is created in order to be able to further reduce the unlocking force on the unlocking operating piece, by making a total length of the unlocking operating piece longer than a total length of the elastic locking piece.

An object of the invention according to the fifth aspect is as follows, in addition to the abovementioned object of the invention according to any of the first to fourth aspects.

Specifically, the invention according to the fifth aspect is created in order to be able to further reduce the unlocking force on the unlocking operating piece, by configuring such that the contact part of the unlocking operating piece is twisted in a direction of unlocking of the elastic locking piece by contacting the elastic locking piece.

Means for Solving the Problems

Each invention respectively has been created in order to achieve each of the abovementioned objects, and the characteristics of each invention are described below in an embodiment of the invention illustrated in the drawings.

The reference numerals in the parentheses are reference numerals used in the mode of working of the invention, and are not to limit the technological scope of the present invention.

Also, the drawing numbers are numbers used in the embodiment of the invention, and are not to limit the technological scope of the present invention.

The invention according to the first aspect is characterized by the following.

First, a holding device (for example, cable clamp 10) has the following configuration, for example, as illustrated in FIG. 1.

(1) Holder Body (for Example, Clamp Body 40)

The holder body (for example, clamp body 40) has a sawtooth-form part (71) having a plurality of indented parts (73) and projecting parts (74) continuing on an outer side, for example, as illustrated in FIG. 1, and is used for holding a part (for example, cable 20), for example, as illustrated in FIG. 2.

(2) Elastic Locking Piece (100)

The elastic locking piece (100) has a locking claw part (101) to be locked to the sawtooth-form part (71), for example, as illustrated in FIGS. 1 and 11 to 13, and is used for locking the part (for example, cable 20) in a state being held in the holder body (for example, clamp body 40) in the locked state, for example, as illustrated in FIG. 2.

(3) Unlocking Operating Piece (110)

The unlocking operating piece (110) is used for contacting the elastic locking piece (100) and unlocking the locked state between the sawtooth-form part (71) and the locking claw part (101), for example, as illustrated in FIGS. 1 and 14.

Second, the sawtooth-form part (71) becomes in the locked state in which the locking claw part (101) of the elastic locking piece (100) has entered the indented part (73) of the sawtooth-form part (71), for example, as illustrated in FIGS. 1 and 11 to 13.

Third, the elastic locking piece (100) has an extending part (102) extending to the outside from the locking claw part (101), for example, as illustrated in FIG. 1.

Fourth, the unlocking operating piece (110) has a contact part (111) for contacting the extending part (102), for example, as illustrated in FIG. 1.

Fifth, when the unlocking operating piece (110) is pressed, the contact part (111) contacts the extending part (102) from the outside, the locking claw part (101) of the elastic locking piece (100) is ejected from the indented part (73) of the sawtooth-form part (71) by that contact, and the locked state between the sawtooth-form part (71) and the locking claw part (101) is unlocked, for example, as illustrated in FIGS. 1 and 14.

The invention according to the second aspect is characterized by the following, in addition to the abovementioned characteristics of the invention according to the first aspect.

Specifically, at least one (for example, contact part 111) of either the extending part (102) of the locking claw part (101) or the contact part (111) of the unlocking operating piece (110) is rendered as an inclined surface (114), for example, as illustrated in FIG. 1.

Although the inclined surface (114) is formed on the contact part (111) of the unlocking operating piece (110), the invention is not limited to this, and the inclined surface may be formed on the extending part (102) of the locking claw part (101), or on both the extending part (102) and the contact part (111).

The invention according to the third aspect is characterized by the following, in addition to the abovementioned characteristics of the invention according to the first aspect.

Specifically, although not illustrated, at least one of either the extending part (102) of the locking claw part (101) or the contact part (111) of the unlocking operating piece (110) is rendered as a curved surface.

The invention according to the fourth aspect is characterized by the following, in addition to the abovementioned characteristics of the invention according to any of the first to third aspects.

First, a total length of the unlocking operating piece (110) is longer than a total length of the elastic locking piece (100), for example, as illustrated in FIG. 1.

Second, a front end side of the contact part (111) of the unlocking operating piece (110) contacts the extending part (102) of the elastic locking piece (100), for example, as illustrated in FIG. 1.

The invention according to the fifth aspect is characterized by the following, in addition to the abovementioned characteristics of the invention according to any of the first to fourth aspects.

Specifically, the unlocking operating piece (110) is such that the contact part (111) of the unlocking operating piece (110) is twisted in a direction of unlocking of the elastic locking piece (100) by contacting the elastic locking piece (100).

Effects of the Invention

The present invention exhibits effects as described below by virtue of being configured as above.

An effect such as the following is exhibited by the invention according to the first aspect.

Specifically, by the invention according to the first aspect, the unlocking force on an unlocking operating piece can be reduced, by providing an extending part extending to the outside from a locking claw part on an elastic locking piece and bringing a contact part of the unlocking operating piece into contact with the extending part from the outside.

An effect such as the following is exhibited by the invention according to the second aspect, in addition to the abovementioned effect of the invention according to the first aspect.

Specifically, by the invention according to the second aspect, the unlocking force on the unlocking operating piece can be further reduced by rendering at least one of either the extending part of the locking claw part or the contact part of the unlocking operating piece as an inclined surface.

An effect such as the following is exhibited by the invention according to the third aspect, in addition to the abovementioned effect of the invention according to the first aspect.

Specifically, by the invention according to the third aspect, the unlocking force on the unlocking operating piece can be further reduced by rendering at least one of either the extending part of the locking claw part or the contact part of the unlocking operating piece as a curved surface.

An effect such as the following is exhibited by the invention according to the fourth aspect, in addition to the abovementioned effect of the invention according to any of the first to third aspects.

Specifically, by the invention according to the fourth aspect, the unlocking force on the unlocking operating piece can be further reduced by making a total length of the unlocking operating piece longer than a total length of the elastic locking piece.

An effect such as the following is exhibited by the invention according to the fifth aspect, in addition to the abovementioned effect of the invention according to any of first to fourth aspects.

Specifically, by the invention according to the fifth aspect, the unlocking force on the unlocking operating piece can be further reduced, by configuring such that the contact part of the unlocking operating piece is twisted in a direction of unlocking of the elastic locking piece by contacting the elastic locking piece.

Figure 1:
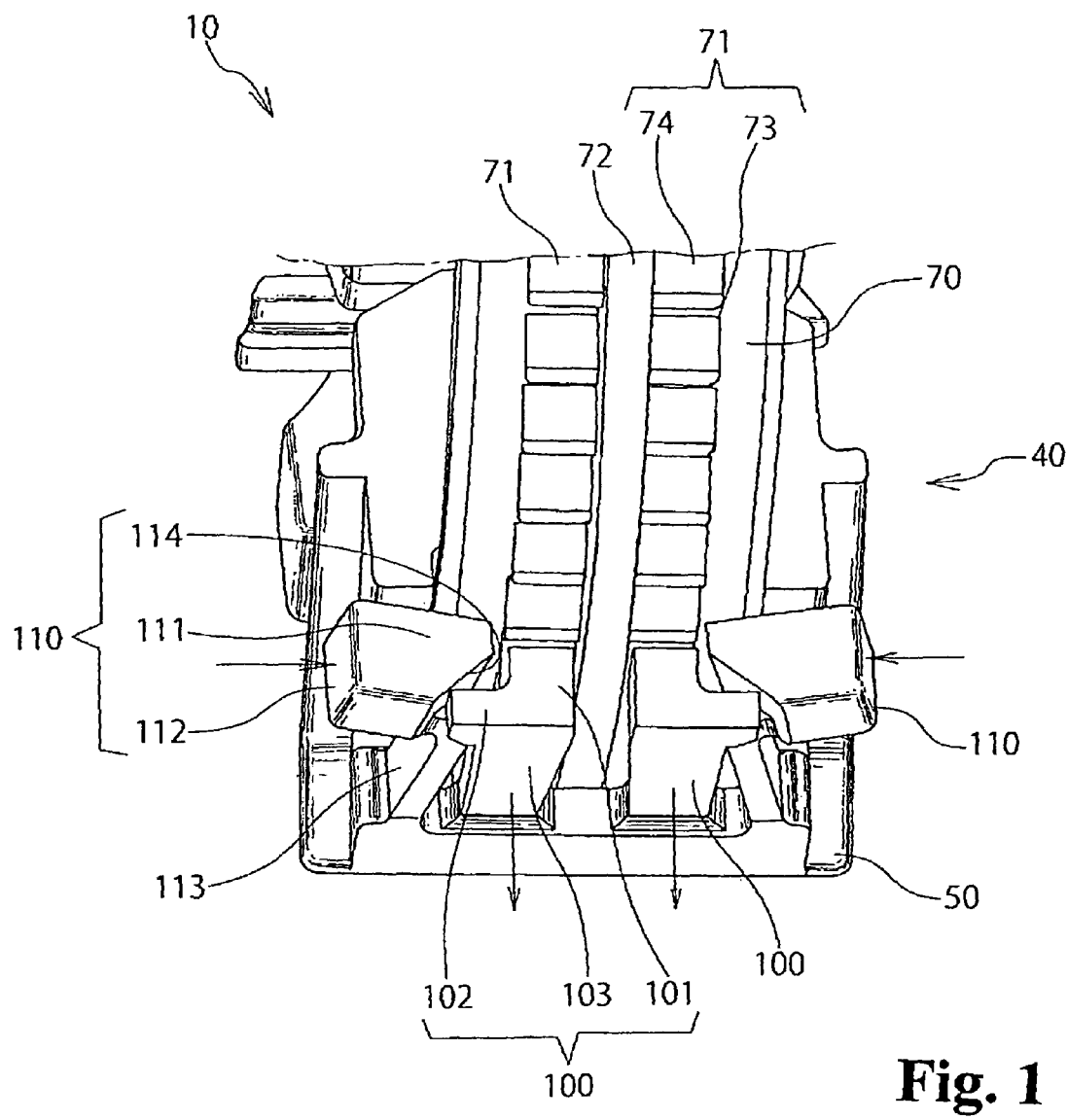
FIG. 1 is a partial perspective view of a cable clamp for describing a state of operation of an unlocking operating piece.

EMBODIMENTS OF THE INVENTION (Cable Clamp 10 (Holding Device))

In the drawings, numeral 10 indicates a cable clamp 10. The cable clamp 10 is one example of a holding device, and is used for fixing a cable 20, which is a part, to a metal stay 30, which is an installation base, as illustrated in FIGS. 2 and 15.

Figure 2:
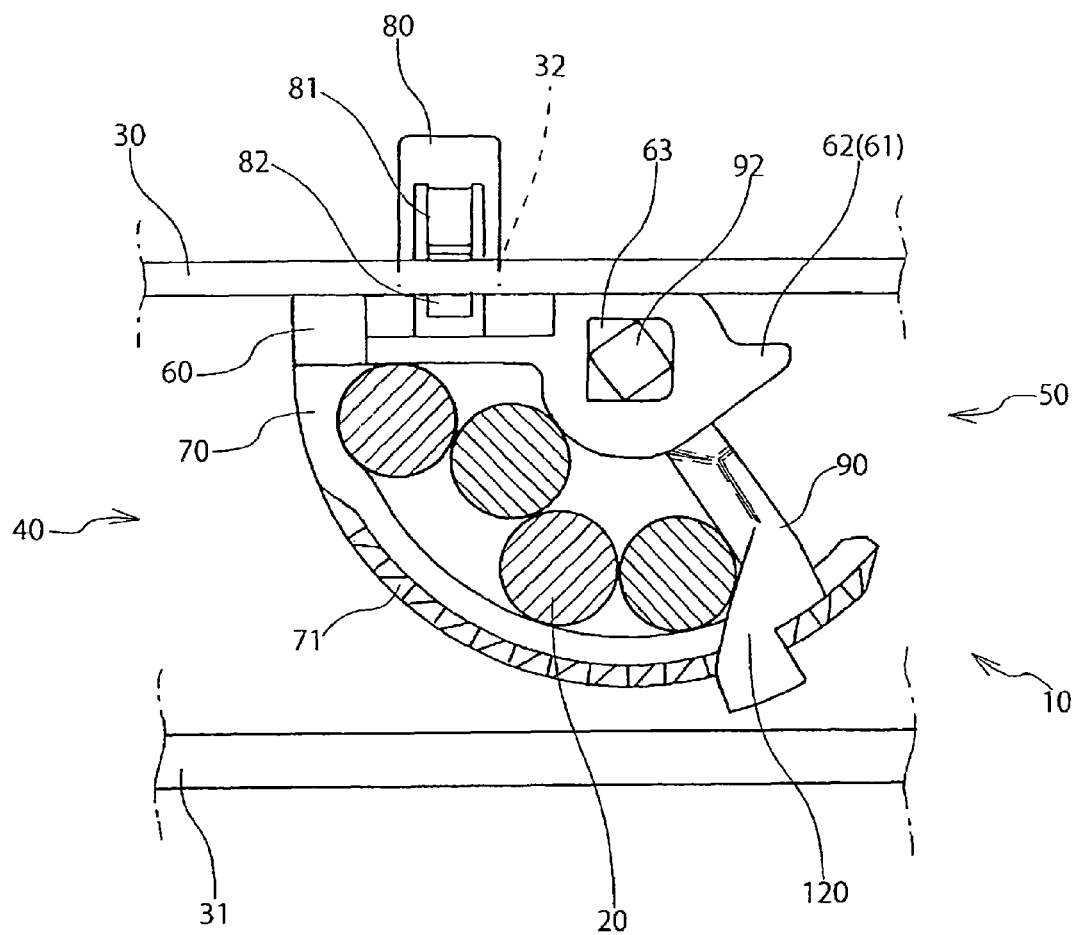
FIG. 2 is a front view for describing an installed state of the cable clamp.
Figure 15:
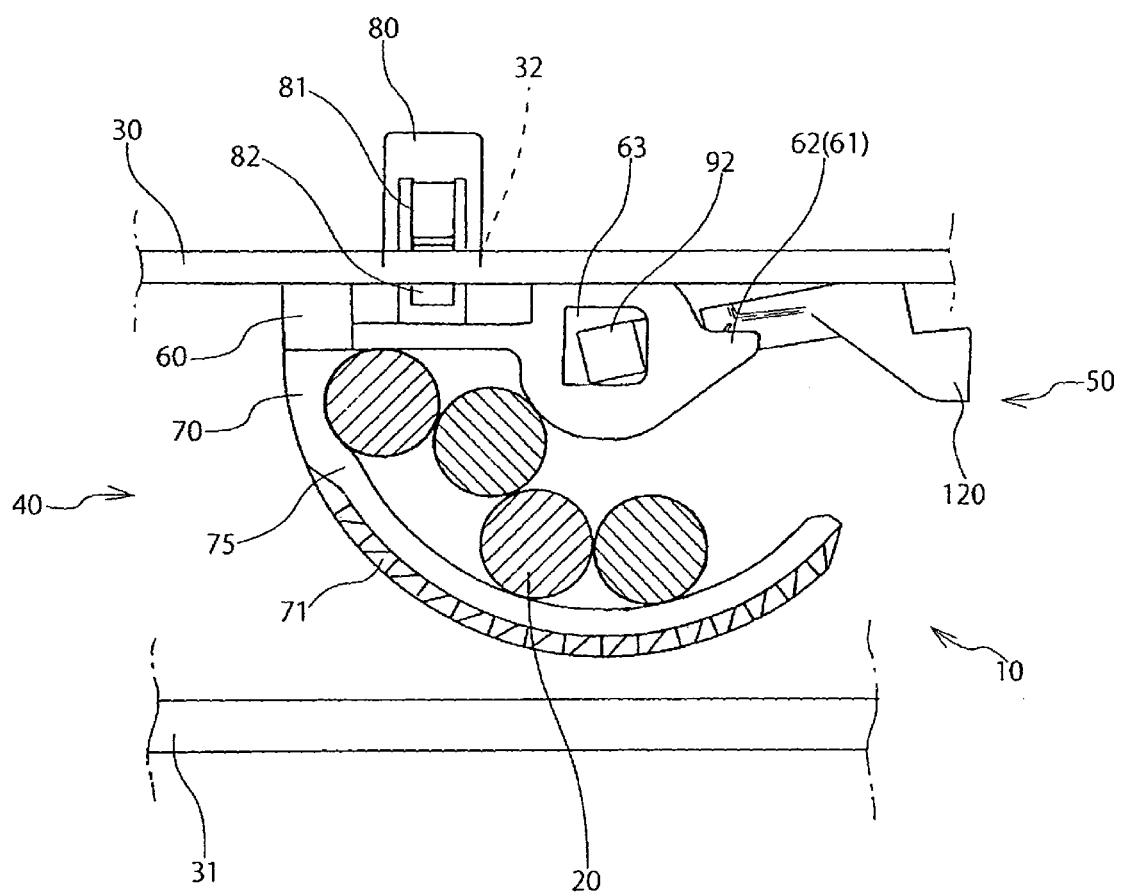
FIG. 15 is a front view for describing the state in which the movable arm is raised, corresponding to FIG. 2.

The metal stay 30 is fixed to a roof material or other structural body 31, and is installed at a distance vertically from the structural body 31, maintaining a space in which the cable clamp 10 can be installed, as illustrated in FIGS. 2 and 15. An installation hole 32 for installing the cable clamp 10 is provided on the metal stay 30. The installation hole 32 runs through the metal stay 30 vertically and is formed in a circular shape. Although the installation hole 32 is formed in a circular shape, the invention is not limited to this, and the installation hole may be formed in a square or other non-circular form.

Although the cable clamp 10 is illustrated as an example of the holding device, the invention is not limited to this, and although not illustrated, the holding device may be a buckle for fastening a belt fixed to a cover of a bag, or a binding device for binding a band wound around a cable or other linear object or rod-form object in a tightened condition. Also, although the cable 20 is illustrated as an example of the part, the invention is not limited to this, and the belt fixed to the cover is the part in the case of the aforementioned buckle, and the cable or other linear object or rod-form object is the part in the case of the binding device. Although the metal stay 30 is illustrated as an example of the installation base, the invention is not limited to this, and a suitcase or briefcase is the installation base in the case of the aforementioned buckle, and there may or may not be an installation base in the case of the binding device. Although the roof material is illustrated as an example of the structural body 31, the invention is not limited to this.

Meanwhile, the cable clamp 10 has the following parts, broadly divided, as illustrated in FIGS. 3 to 10.

The following (1) and (2) are described later.

(1) Clamp body 40
(2) Movable arm 50

The parts of the cable clamp 10 are not limited to the abovementioned (1) and (2).

(Clamp Body 40)

The clamp body 40 is one example of the holder body, and is used for holding the cable 20 (part), as illustrated in FIG. 2. The clamp body 40 is integrally molded from "PBT" (polybutylene terephthalate) or other thermoplastic synthetic resin having a suitable degree of elasticity and rigidity, integrally with a movable arm 50 to be described. Although the clamp body 40 and the movable arm 50 are integrally molded, the invention is not limited to this, and the parts may be molded individually and assembled.

Although the clamp body 40 is illustrated as an example of the holder body, the invention is not limited to this.

The clamp body 40 has the following parts, broadly divided, as illustrated in FIGS. 3 to 10.

The following (1) to (3) are described later.

(1) Base part 60
(2) Clamp part 70
(3) Support leg 80

The parts of the clamp body 40 are not limited to the abovementioned (1) to (3).

(Movable Arm 50)

The movable arm 50 is used for locking in a state in which the cable 20 (part) is held by the clamp body 40, as illustrated in FIG. 2.

The movable arm 50 has the following parts, broadly divided, as illustrated in FIGS. 3 to 10.

The following (1) to (4) are described later.

(1) Cover part 90
(2) Elastic locking piece 100
(3) Unlocking operating piece 110
(4) Contact frame 120

The parts of the movable arm 50 are not limited to the abovementioned (1) to (4).

(Base Part 60)

Figure 3:
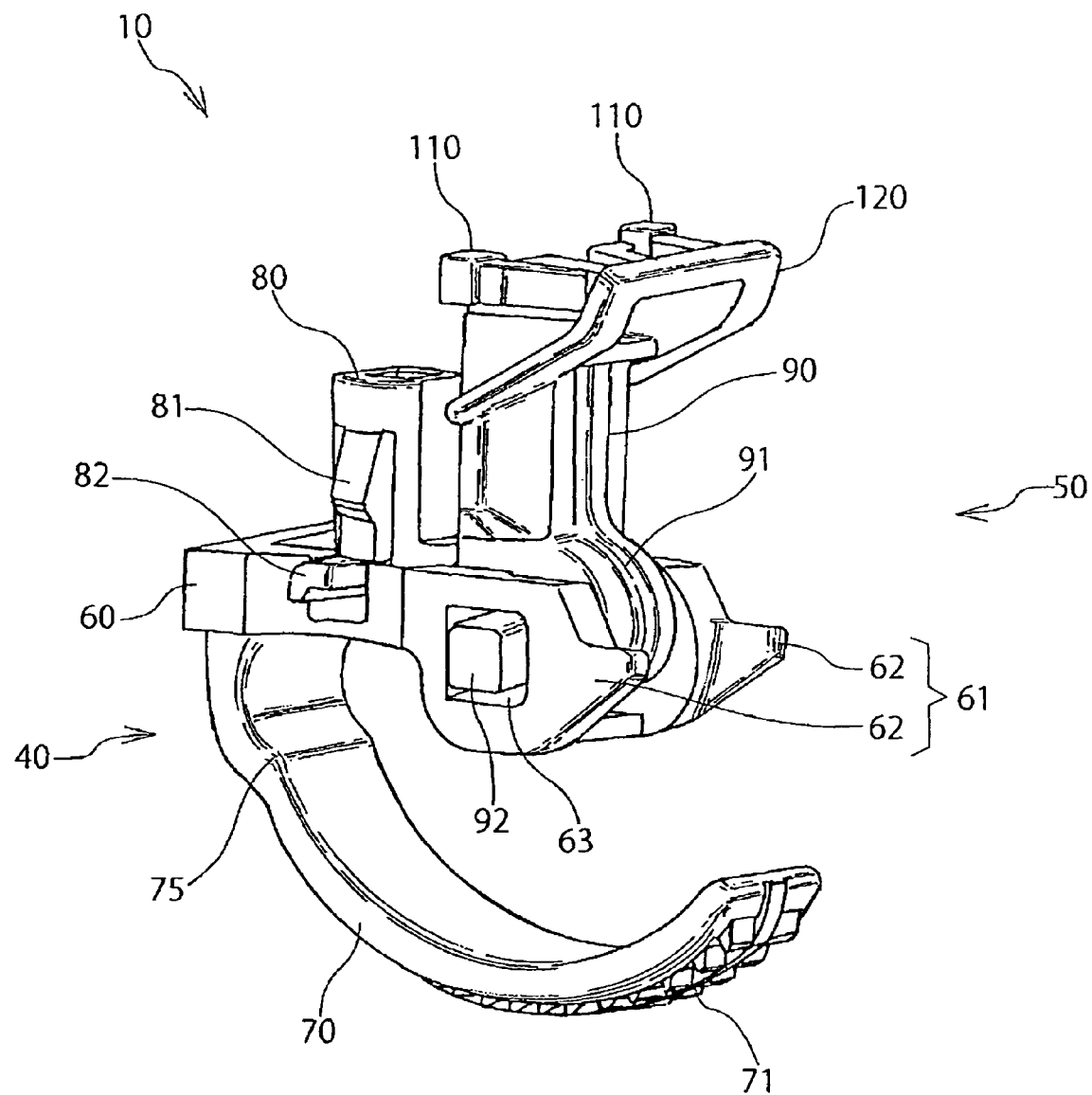
FIG. 3 is a perspective view of the cable clamp in the molded condition.
Figure 4:
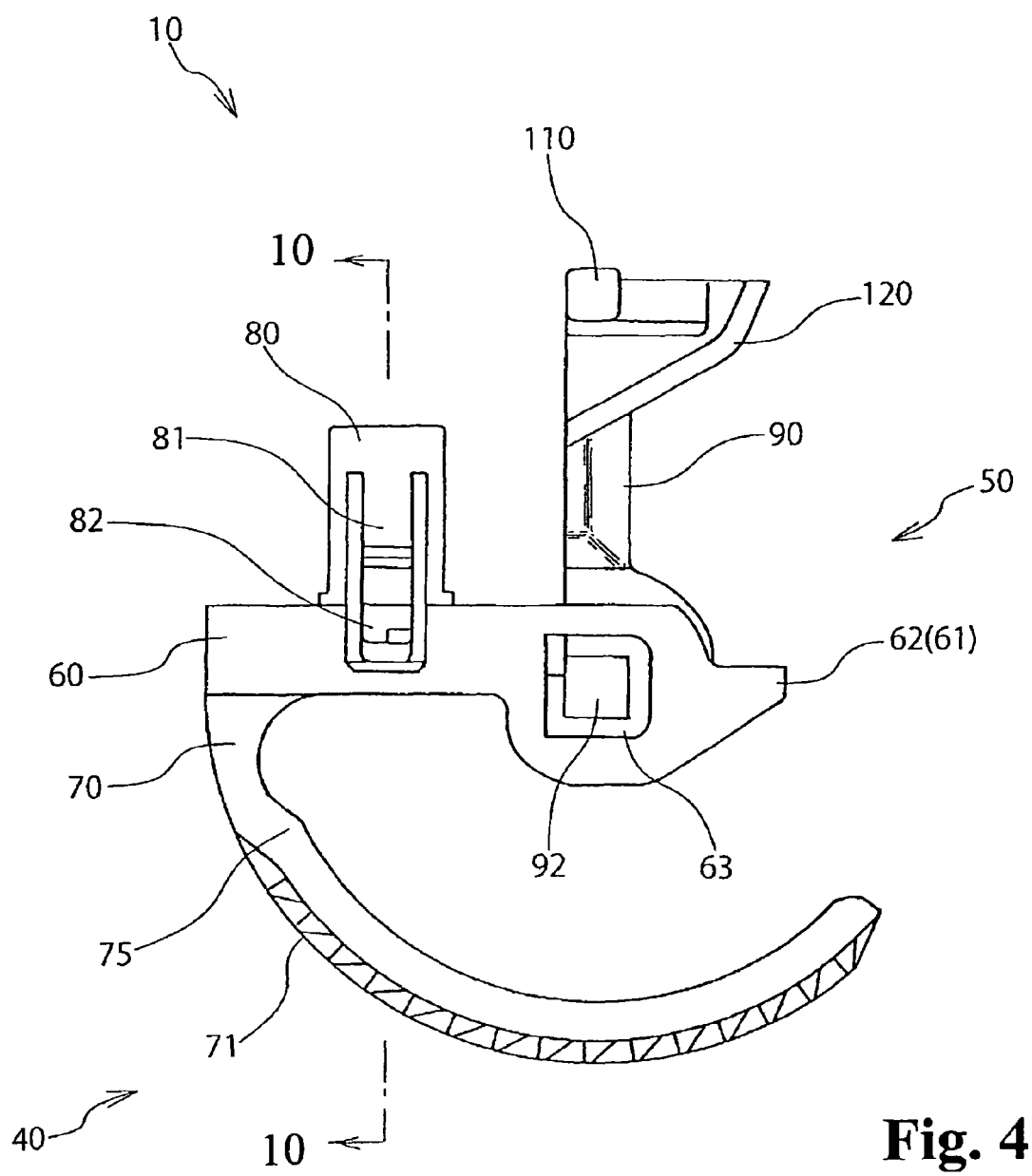
FIG. 4 is a front view of the cable clamp in the molded condition.

The base part 60 is formed roughly in a plate form, extending in the lengthwise direction of the metal stay 30, as illustrated in FIGS. 2 to 4.

A shaft bearing part 61 for supporting a cover part 90, to be described, of the movable arm 50 to be capable of rotation is provided on one end part in the length direction of the base part 60.

The shaft bearing part 61 has the following parts, broadly divided, as illustrated in FIGS. 3 and 4.

The parts of the shaft bearing part 61 are not limited to the following (1) and (2).

(1) Shaft Bearing Piece 62

Figure 6:
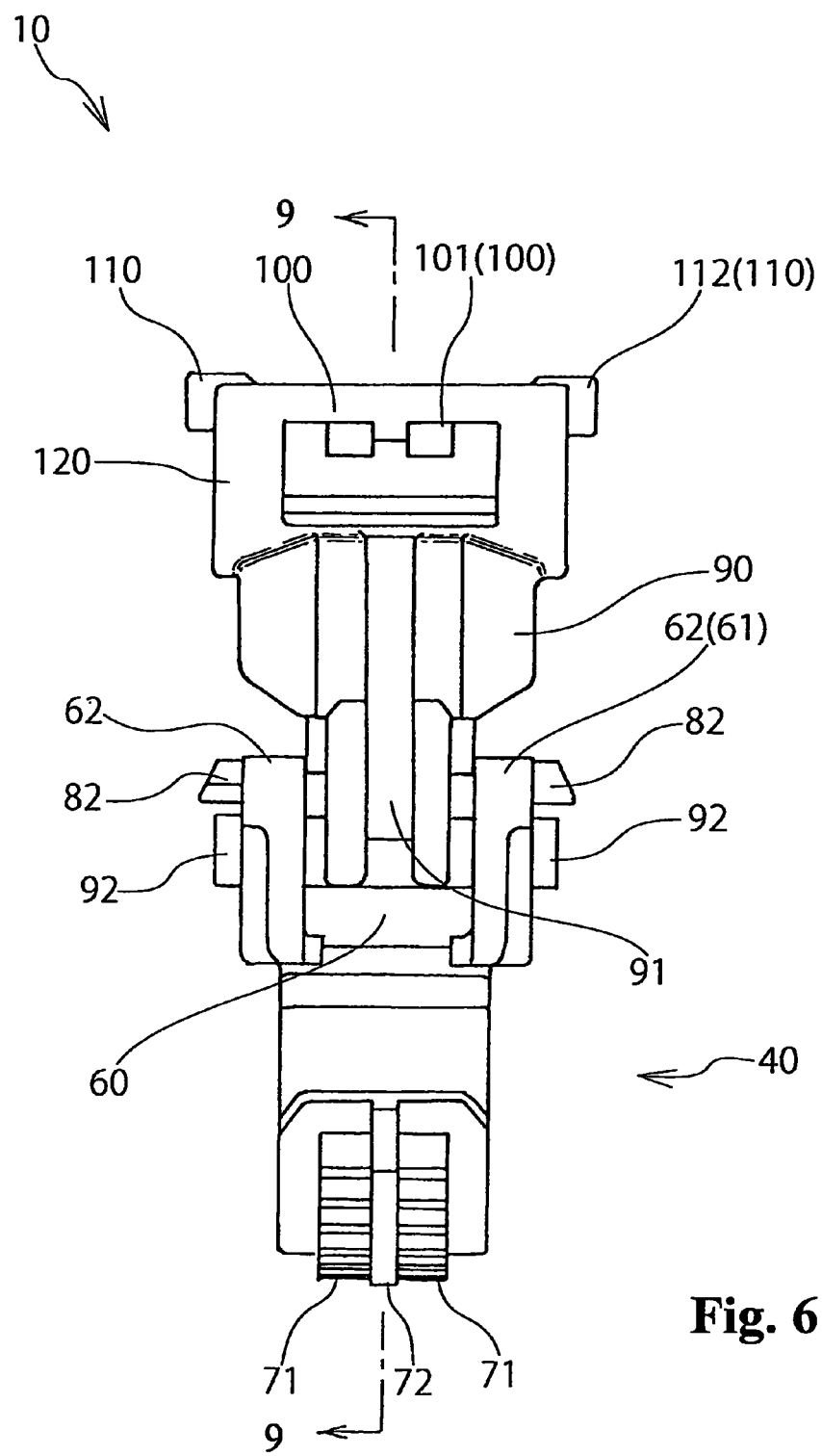
FIG. 6 is a right-side view of the cable clamp in the molded condition.
Figure 7:
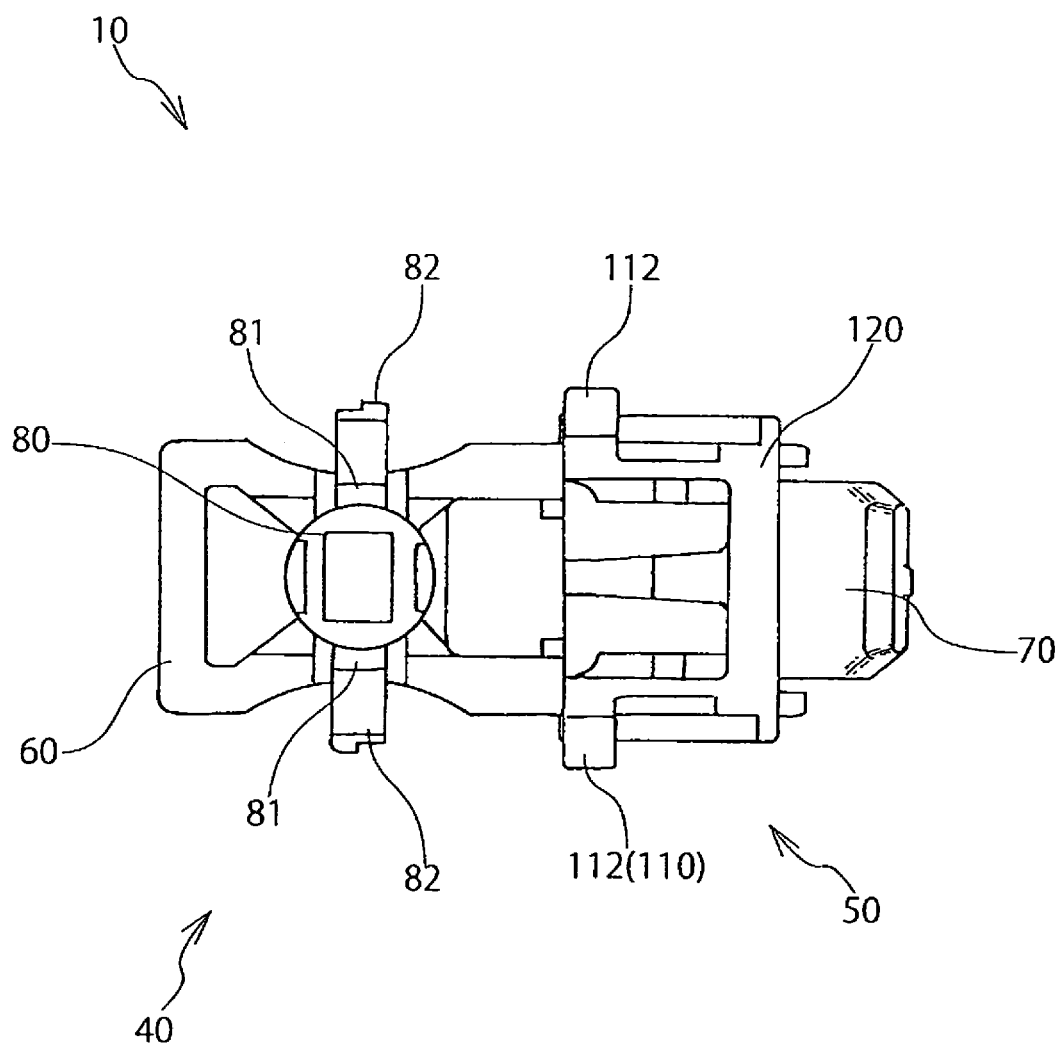
FIG. 7 is a plan view of the cable clamp in the molded condition.
Figure 8:
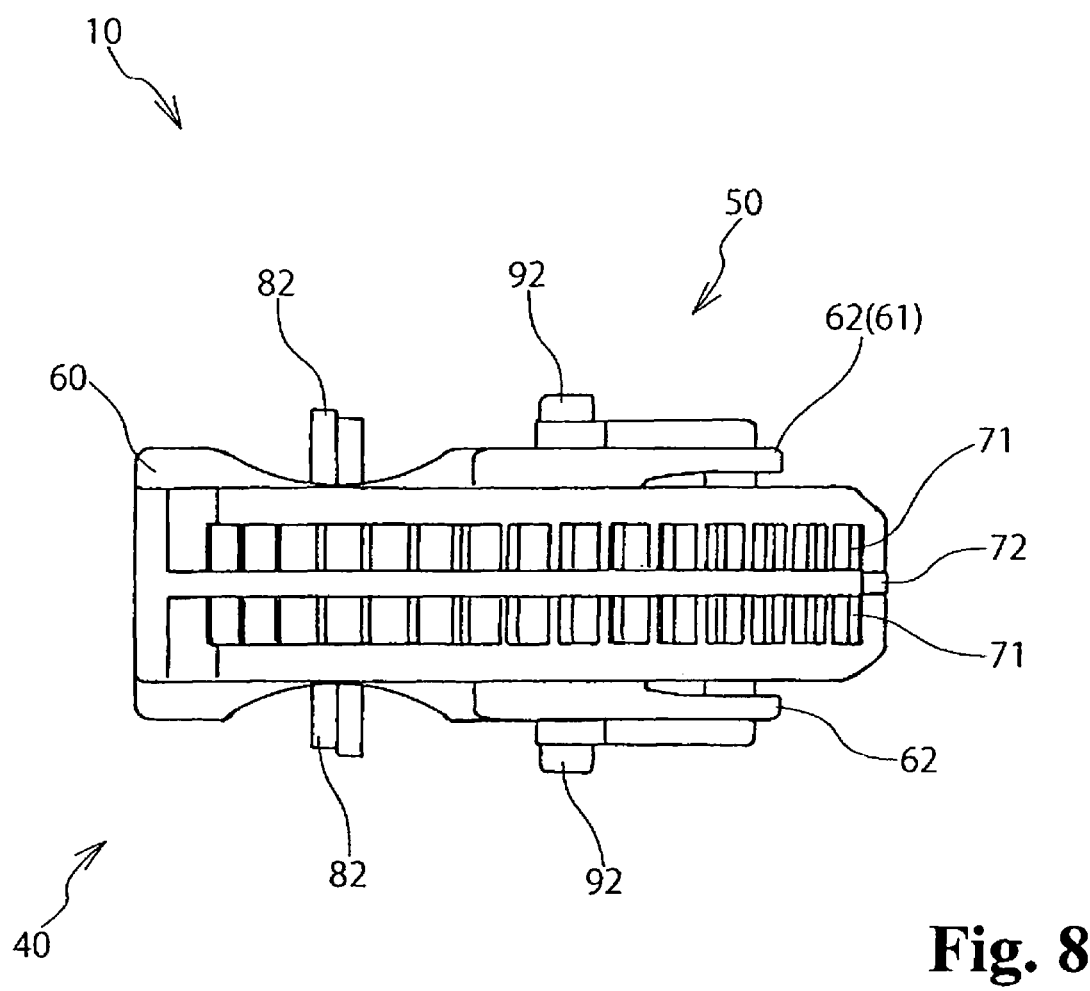
FIG. 8 is a bottom view of the cable clamp in the molded condition.
Figure 9:
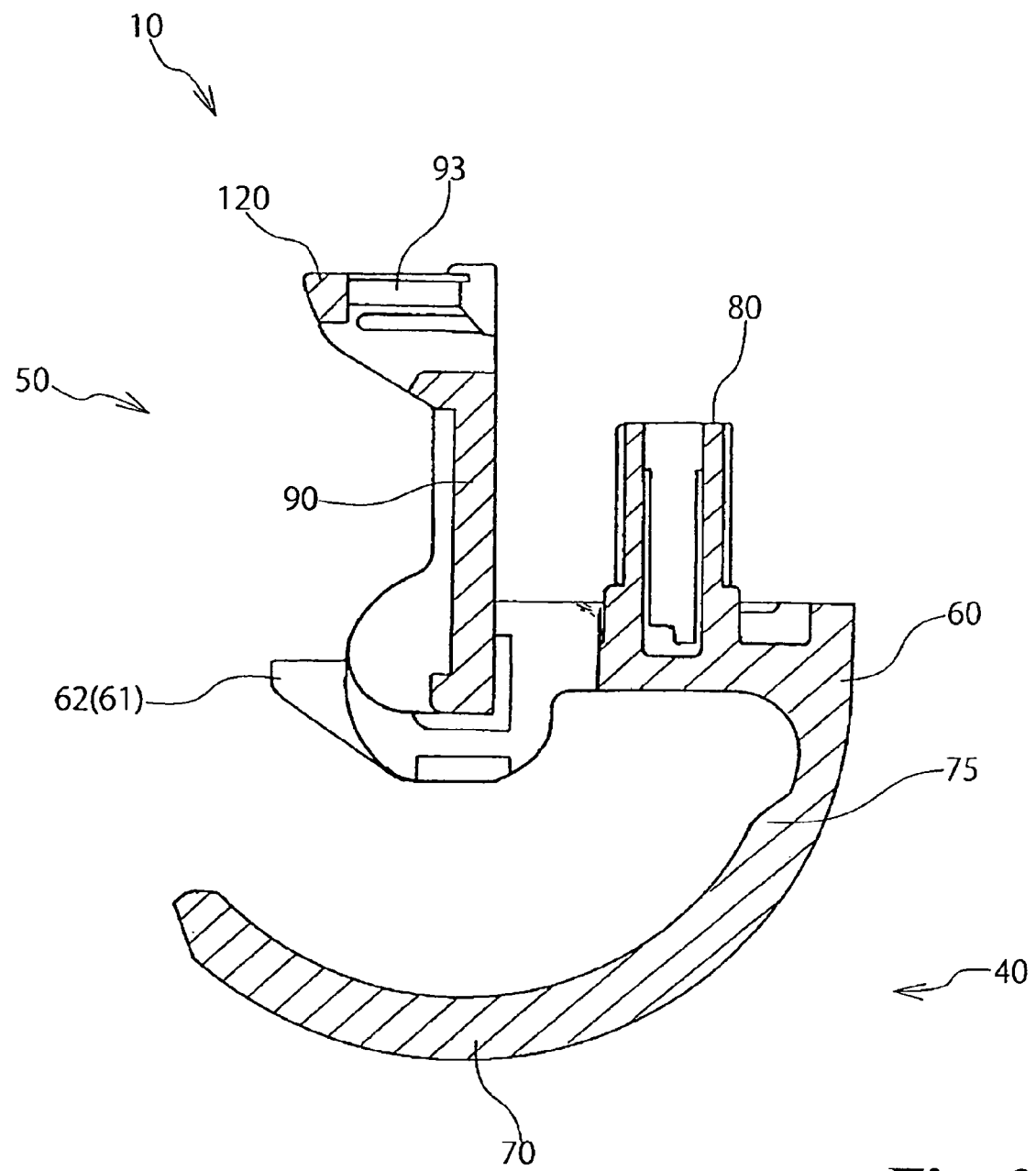
FIG. 9 is a cross-sectional view taken along the line 9-9 in FIG. 6.
Figure 10:
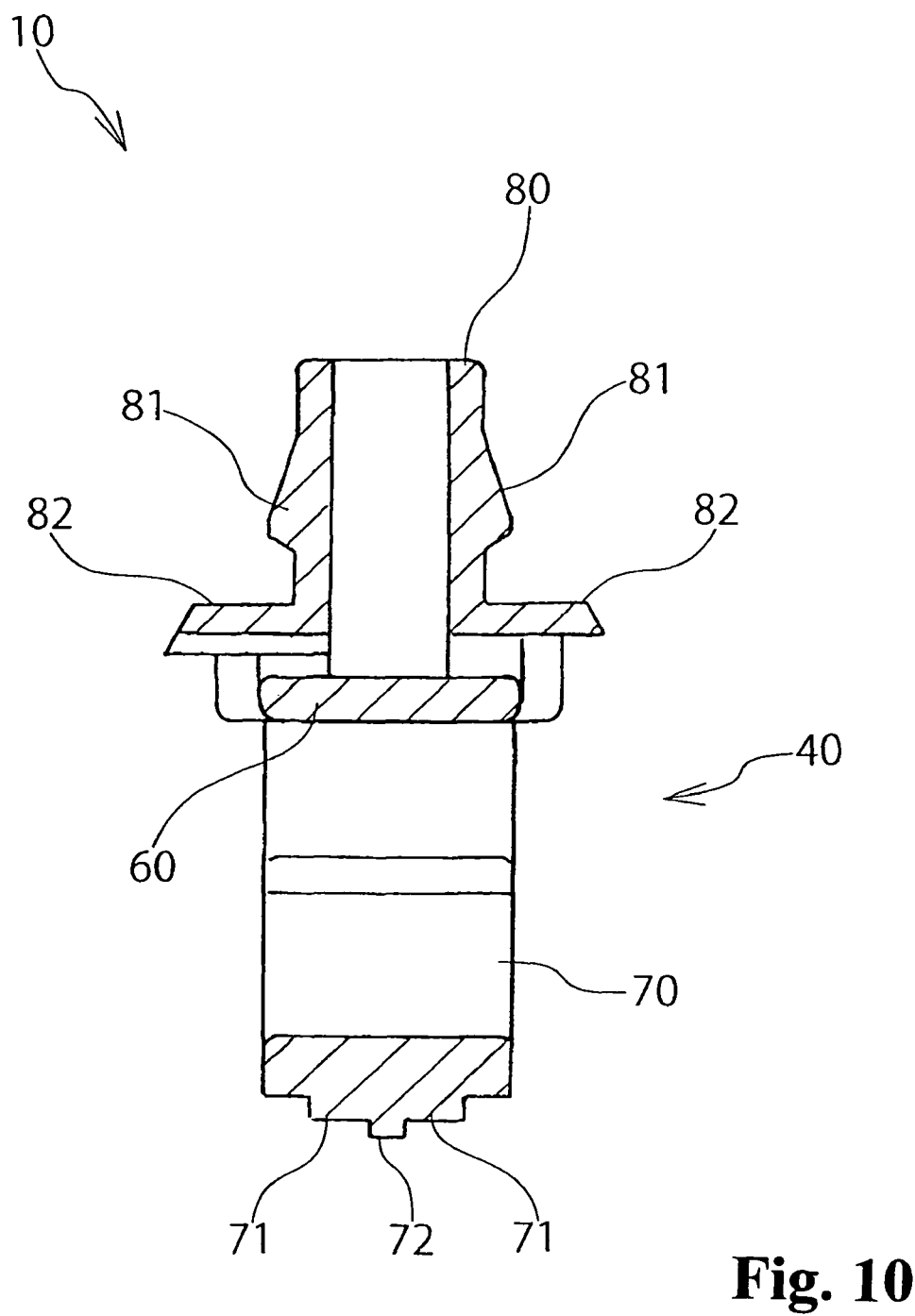
FIG. 10 is a cross-sectional view taken along the line 10-10 in FIG. 6.

A pair of shaft bearing pieces 62 extends in parallel from one end part of the base part 60, to be positioned at a distance maintaining a gap in which a harrow-width insertion part 91 of the cover part 90 to be described is inserted, as illustrated in FIGS. 3 and 6.

(2) Shaft Hole 63

A pair of shaft holes 63 is formed opposite each other in a square shape, running through each shaft bearing piece 62 horizontally, as illustrated in FIGS. 3 and 4.

Although the shaft hole 63 is formed in a square shape, the invention is not limited to this, and the shaft hole may be formed in a non-circular shape other than square, or in a circular shape.

A projecting shaft 92 of the cover part 90, to be described, of the movable arm 50 is inserted into the shaft hole 63. Although the shaft hole 63 is provided on the base part 60 and the projecting shaft 92 is provided on the cover part 90, the invention is not limited to this, and although not illustrated, the projecting shaft may be provided on the base part 60 and the shaft hole may be provided on the cover part 90.

(Clamp Part 70)

The clamp part 70 is connected to the base part 60, and is used for holding a cable 20, as illustrated in FIG. 2.

The clamp part 70 is connected at a base end part thereof on the other end part of the base part 60 opposite the end part having the shaft bearing part 61, and extends being curved downward in a C shape, and a front end part thereof is a free end part, as illustrated in FIGS. 3 and 4. The free end part positioned on the front end part of the clamp part 70 is positioned at a distance downward from the movable arm 50, and maintains a gap in which the cable 20 can be inserted in the space formed with the movable arm 50, as illustrated in FIG. 15. Specifically, the movable arm 50 is molded in a state standing upward intersecting with the base part 60 during molding, as illustrated in FIGS. 3 and 4, and is rotated to roughly parallel with the base part 60 during use, as illustrated in FIG. 15. In this state being rotated to roughly parallel, a gap in which the cable 20 can be inserted arises between the cover part 90, to be described, of the movable arm 50 and the free end part positioned on the leading end part of the clamp part 70.

The cable 20 inserted from the gap between the free end part of the clamp part 70 and the cover part 90 can be mounted and provisionally held on the inner perimeter surface of the clamp part 70, as illustrated in FIG. 15.

The clamp part 70 has the following parts, broadly divided, although not illustrated in FIGS. 3 to 6.

The following (1) to (3) are described later.
(1) Sawtooth-form part 71
(2) Rib 72
(3) Step part 75

The parts of the clamp part 70 are not limited to the above (1) to (3).

(Sawtooth-Form Part 71)

Figure 11:
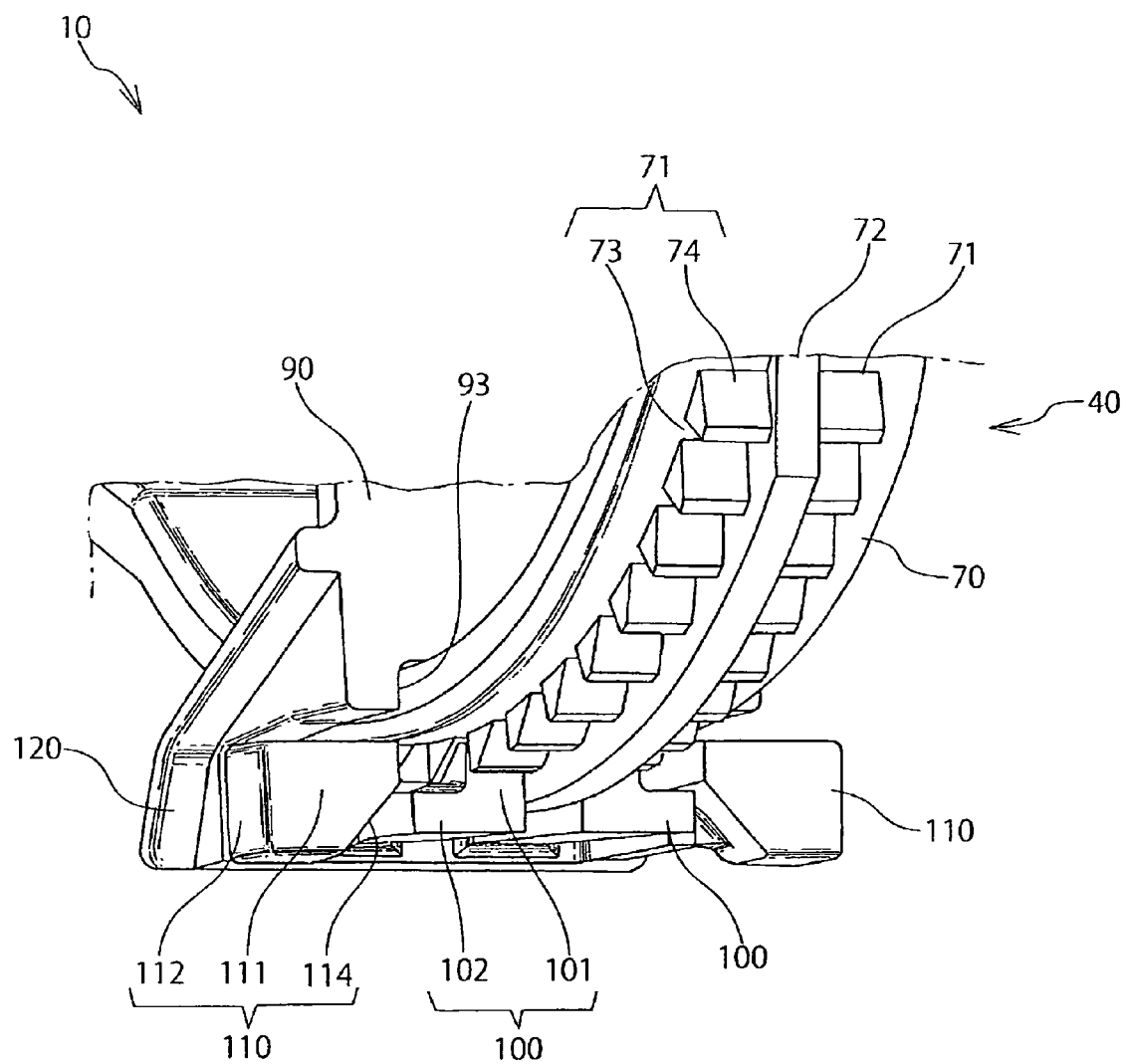
FIG. 11 is a partial perspective view of the cable clamp for describing the locked state between the clamp part and the movable arm part.
Figure 12:
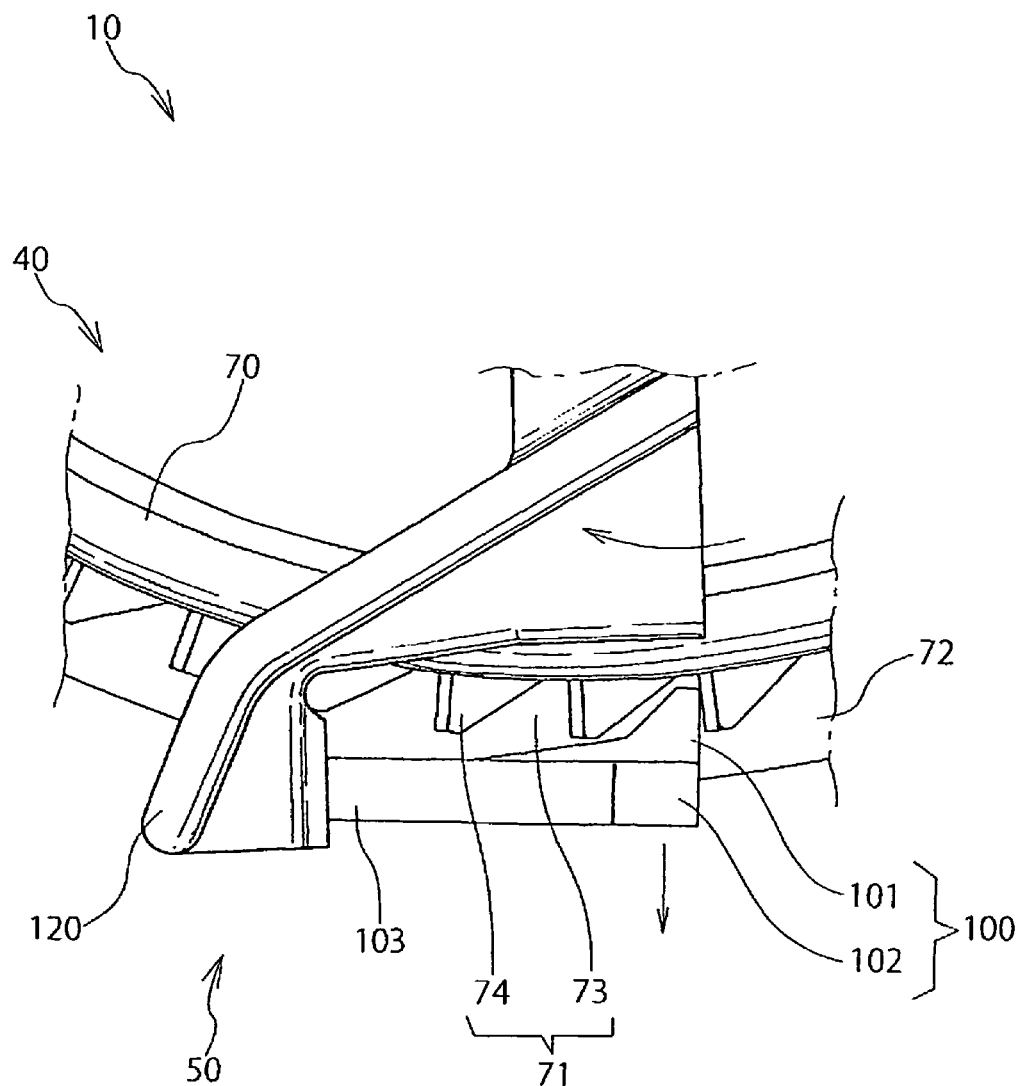
FIG. 12 is a partial front view of the cable clamp for describing the locked state between the clamp part and the movable arm part.

The sawtooth-form part 71 is positioned on the outside, that is, the outer perimeter surface of the clamp part 70, although not illustrated in FIGS. 3 to 6, and has a plurality of indented parts 73 and projecting parts 73 continuing thereon, as illustrated in FIGS. 1 and 11 to 12. The projecting part 74 is formed roughly in a trapezoidal shape having an inclined surface oriented toward the free end part on the front end of the clamp part 70, and a surface to the back of the inclined surface is cut upright.

(Rib 72)

The rib 72 is positioned in the center in the width direction of the clamp part 70, and divides the sawtooth-form part 71 into two parts, left and right, although not illustrated in FIGS. 3 to 6 and 8.

(Step Part 75)

The step part 75 is uplifted in arc form in section from the inner perimeter surface of the clamp part 70, and is used for contacting the outer perimeter surface 20 of the cable 20 held on the clamp part 70, as illustrated in FIGS. 2 to 4 and 9. The step part 75 is positioned toward the base end part of the clamp part 70 connected to the base part 60, and is configured to be capable of holding one cable 20 in the space formed with the lower surface of the base part 60.

The step part 75 is configured to be capable of holding one cable 20 without rattling, in cooperation with an inclined inside surface of a contact frame 120, to be described, of the movable arm 50, in the case when the number of cables 20 held on the clamp part 70 is few, for example, one.

(Support Leg 80)

The support leg 80 is connected to the base part 60, and is installed in the installation hole 32 of the metal stay 30, as illustrated in FIG. 2.

The support leg extends in a tubular shape, for example, a round tubular shape, upward from midcourse of the length of the base part 60, as illustrated in FIGS. 3 to 5, 7, 9, and 10, and the outer diameter thereof is set to the inner diameter of the installation hole 32 or smaller, as illustrated in FIG. 2.

The support leg 80 has the following parts, broadly divided, as illustrated in FIGS. 3 to 5, 7, and 10.

The parts of the support leg 80 are not limited to the following (1) and (2).

(1) Support Claw 81

A pair of support claws 81 projects elastically from the outer perimeter of the support leg 80, diametrically in the present invention, as illustrated in FIGS. 3 to 5, 7, and 10.

Although the support claws 81 project as a pair, the invention is not limited to this, and three or more may project radially.

(2) Operating Piece 82

A pair of operating pieces 82 projects from the outside surface of the base part 60, extending downward from the support claws 81, and extending bending in an L shape in section toward the base part 60, as illustrated in FIGS. 3 to 5, 7, and 10.

(Cover Part 90)

The cover part 90 is supported at one end part thereof to be capable of rotating on the shaft bearing part 61 of the base part 60, as illustrated in FIGS. 3, 4, and 6, and is rotated downward toward the clamp part 70 to close the gap in the space formed with the clamp part 70 and to hold the cable 20 in the space formed with the clamp part 70, as illustrated in FIG. 2.

Figure 5:
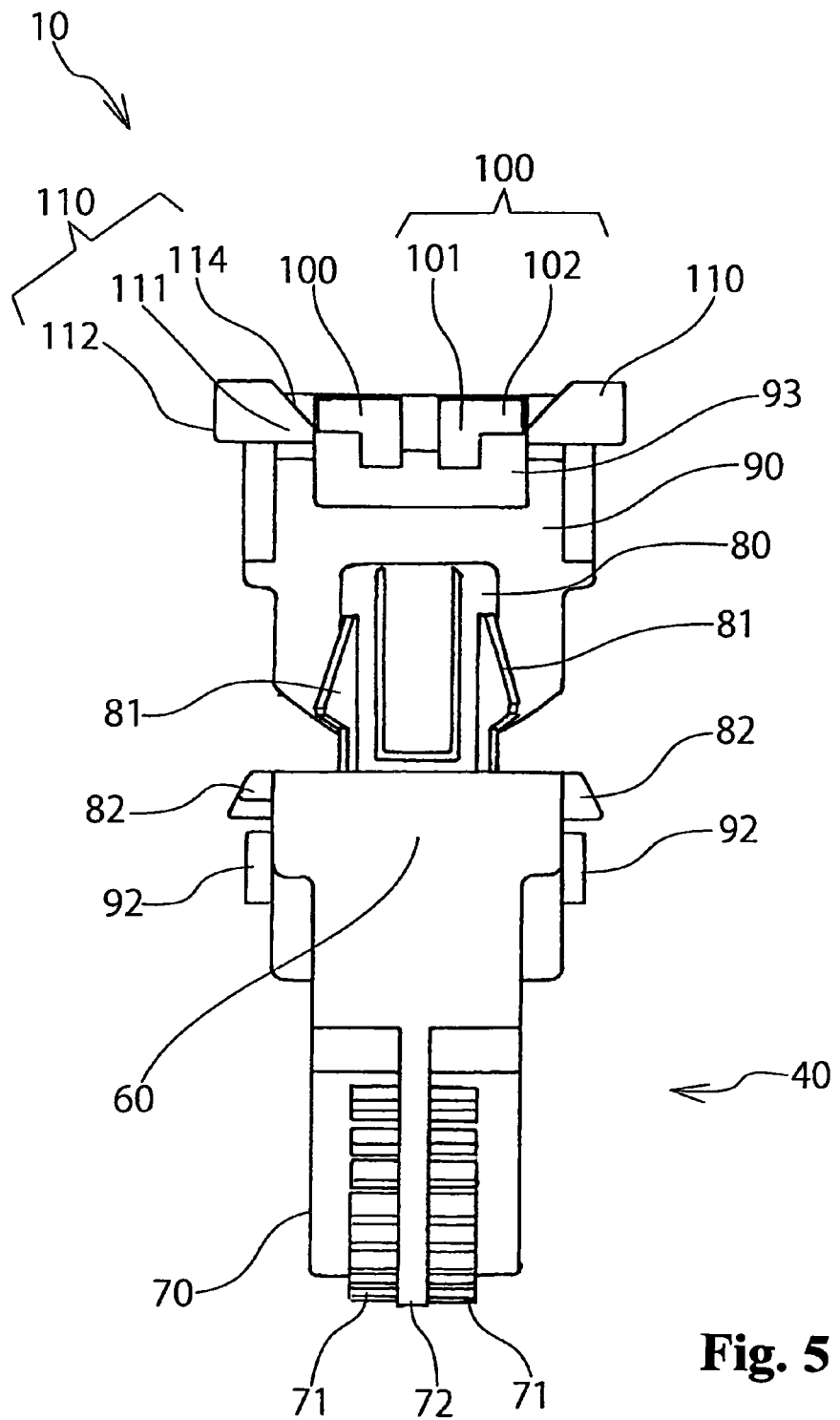
FIG. 5 is a left-side view of the cable clamp in the molded condition.

The cover part 90 is formed roughly in a plate form extending a distance toward the clamp part 70, as illustrated in FIGS. 4, 5, and 6.

The cover part 90 has the following parts, broadly divided, as illustrated in FIGS. 3, 4, and 6.

The following (1) to (3) are described later.
(1) Insertion part 91
(2) Projecting shaft 92
(3) Guide slot 93

The parts of the cover part 90 are not limited to the above-mentioned (1) to (3).

(Insertion Part 91)

The insertion part 91 is positioned on one end part in the length direction of the cover part 90, is inserted into the gap between the pair of shaft bearing pieces 62 of the base part 60, and is formed to a narrow width, as illustrated in FIGS. 3 and 6.

The horizontal width of the insertion part 91 is set to a slightly wider width than the gap between the pair of shaft bearing pieces 62, and the state in which the cover part 90 was rotated to roughly in parallel with the base part 60 is maintained in that rotated state of the cover 90 by friction resistance between the two, as illustrated in FIG. 15.

(Projecting Shaft 92)

A pair of projecting shafts 92 projects outward backing against each other from both ends in the width direction of the insertion part 91, as illustrated in FIGS. 3, 4, and 6. The projecting shafts 92 are inserted into each shaft hole 63 of the pair of shaft bearing pieces 62 of the base part 60, and are formed in an angular columnar form, square in section, smaller than the inner diameter of the shaft hole 63.

(Guide Slot 93)

The guide slot 93 is positioned on the other end part in the length direction of the cover part 90, and is fitted on the outside of the clamp part 70, as illustrated in FIG. 6.

The guide slot 93 is formed in a recessed form having an open end surface, and the slot width thereof, is set to the horizontal width of the clamp part 70 or larger.

(Elastic Locking Piece 100)

The elastic locking piece 100 is connected to the cover part 90, and is locked to the sawtooth-form part 71 of the clamp part 70, as illustrated in FIGS. 1 and 11 to 13.

A pair of elastic locking pieces 100 is formed because the sawtooth-form part 71 is divided into two parts by the rib 72.

The elastic locking piece 100 has the following parts, broadly divided, as illustrated in FIGS. 1 and 11 to 13.

The parts of the elastic locking piece 100 are not limited to the following (1) to (3).

(1) Locking Claw Part 101

The locking claw part 101 faces the guide slot 93 of the cover part 90, and is inserted into one of the indented parts 73 of the sawtooth-form part 71 of the clamp part 70 in a state in which the clamp part 70 is inserted into the guide slot 93, as illustrated in FIGS. 1 and 11 to 13.

The locking claw part 101 has an inclined surface for contacting the inclined surface of the projecting part 74 of the sawtooth-form part 71, and is formed roughly in a trapezoidal shape in section. The locking claw part 101 is connected to the cover part 90 by way of a connecting part 103 to be described, and is urged toward the indented part 73 of the sawtooth-form part 71 by an elastic return force of the connecting part 103.

(2) Extending Part 102

The extending part 102 extends outward from the locking claw part 101, as illustrated in FIGS. 1 and 11 to 13.

The extending part 102 extends bending in an L shape outward from the locking claw part 101.

(3) Connecting Part 103

The connecting part 103 is used for elastically connecting the locking claw part 101 to the cover part 90.

The connecting part 103 and the locking claw part 101 bend in an L shape.

(Unlocking Operating Piece 110)

The unlocking operating piece 110 is connected to the cover part 90, and is used for contacting the elastic locking piece 100 and unlocking the locked state between the sawtooth-form part 71 of the clamp part 70 and the locking claw part 101 of the elastic locking piece 100, as illustrated in FIGS. 1 and 11 to 13.

Also, the total length of the unlocking operating piece 110 is set longer than the total length of the elastic locking piece 100, as illustrated in FIG. 1. The front end part of the contact part 111 of the unlocking operating piece 110 contacts the extending part 102 of the elastic locking piece 100, as illustrated in FIG. 1. As a result, the operating stroke of the unlocking operating piece 110 can be made larger, compared with the distance over which the locking claw part 101 of the elastic locking piece 100, being inserted into the indented part 73 of the sawtooth-form part 71 of the clamp part 70, is brought up from that indented part 73. The unlocking force on the unlocking operating piece 110 can therefore be reduced by making the operating stoke larger.

Unlocking operating pieces 110 are provided respectively on the pair of elastic locking pieces 100, and are operated in a manner so as to pinch with two fingers (not illustrated) in a direction of approaching each other.

The unlocking operating piece 110 has the following parts, broadly divided, as illustrated in FIGS. 1 and 11 to 13.

The following (1) to (3) are described later.

(1) Contact part 111
(2) Operating part 112
(3) Connecting part 113

The parts of the unlocking operating piece 110 are not limited to the abovementioned (1) to (3).

(Contact Part 111)

The contact part 111 is used for contacting the extending part 102 of the elastic locking piece 100, as illustrated in FIGS. 1 and 11 to 13. When the unlocking operating piece 110 is pressed, the contact part 111 contacts the extending part 102 from the outside, the locking claw part 101 on the front end of the elastic locking piece 100 is ejected from the indented part 73 of the sawtooth-form part 71 by that contact, and the locked state between the sawtooth-form part 71 and the locking claw part 101 is unlocked, as illustrated in FIGS. 1 and 14.

The contact part 111 is positioned on the end part on the inside of the unlocking operating piece 110, and is provided with an inclined surface 114 on the end surface opposite the extending part 102.

The inclined surface 114 is formed by changing the distance between the contact part 111 and an operating part 112 to be described. Specifically, the inclined surface 114 is inclined such that the distance between the contact part 111 and the operating part 112 is long on the side at the bottom of the indented part 73 of the sawtooth-form part 71 and the distance gradually becomes shorter going away from the bottom of the indented part 73. The contact part 111 acts as a wedge, operating in a manner so as to come between the extending part 102 of the elastic locking piece 100 and the sawtooth-form part 71, to gradually bring up the locking claw part 101 of the elastic locking piece 100 from the bottom of the indented part 73, when the pair of unlocking operating pieces 110 is operated in the direction of approaching each other.

Although the inclined surface 114 is provided on the end part of the contact part, the invention is not limited to this, and although not illustrated, the inclined surface may be provided on the end part of the extending part 102 opposite the contact part 111, or inclined surfaces may be provided respectively on the opposite end parts of the contact part 111 and the extending part 102.

Also, the invention is not limited to the inclined surface 114, and although not illustrated, a curved surface may be provided on the end part of the contact part 111. The curved surface also is bent in the same manner as the inclined surface 114, such that the distance between the contact part 111 and the operating part 112 is long on the side at the bottom of the indented part 73 of the sawtooth-form part 71 and the distance gradually becomes shorter going away from the bottom of the indented part 73. The curved surface also is not limited to the end part of the contact surface, and although not illustrated, the curved surface may be provided on the end part of the extending part 102 opposite the contact part 111, or curved surfaces may be provided respectively on the opposite end parts of the contact part 111 and the extending part 102.

(Operating Part 112)

The operating part 112 is used for operating the unlocking operating piece 110, as illustrated in FIGS. 1 and 11 to 13.

Operating parts 112 are positioned on the end parts on the outside of the unlocking operating pieces 110, and are operated with fingers (not illustrated) in a manner so as to push the contact parts 111 positioned on the inside end parts in the direction of approaching each other.

(Connecting Part 113)

The connecting part 113 is used for elastically connecting the elastic locking piece 100 to the cover part 90.

The connecting part 113 is connected on the side of the contact part 111 of the elastic locking piece 113, and is used for urging the contact part 111 in the direction of moving away from the extending part 102 of the elastic locking piece 100, and for returning the unlocking operating piece 110 by that urging force.

Also, the contact part 113 is twisted when the unlocking operating pieces 116 are pushed with fingers (not illustrated) in the direction of approaching each other, and an elastic return force to return that twisting arises.

(Contact Frame 120)

The contact frame 120 is connected to the cover part 90 and borders the periphery of the guide slot 93 in a bridge form, and contacts the cable 20 held in the clamp part 70, as illustrated in FIGS. 3, 6, 7, 11, and 12.

The contact frame 120 is projected in rib form from midcourse of the length of the cover part 90 to the front end part having the guide slot 93, and an inside surface for contacting the cable 20 is inclined diagonally such that the amount of projection is gradually increased going toward the clamp part 70, as illustrated in FIG. 2.

(Method of Use of Cable Clamp 10)

The method of use of the cable clamp 10 having the above-mentioned configuration is next described.

The method of use of the cable clamp 10 is described separated into the following methods of use.

(1) Method of installation on metal stay 30
(2) Method of holding of cable 20
(3) Method of removal of cable 20

(Method of Installation on Metal Stay 30)

The support leg 80 of the cable clamp 10 is aligned with the installation hole 32 of the metal stay 30 and is inserted upward from below, as illustrated in FIGS. 2 and 15.

When the support leg 80 is inserted, the support claw 81 thereof is pressed to the inner edge of the installation hole 32 and bends inward toward the hollow tube inner part, whereby the outer diameter of the support leg 80 is contracted.

The support claw 81 returns by the elastic force of the resin on passing through the installation hole 32, and holds the metal stay 30 from above and below in the space formed with the upper face of the base part 60, whereby the cable clamp 10 is fixed to the installation hole 32 of the metal stay 30.

Meanwhile, when removing the cable clamp 10, the pair of operating pieces 82 is pinched with fingers and the support claw 81 is bent inward toward the hollow tube inner part, whereby the support leg 80 can be removed from the installation hole 32 of the metal stay 30.

(Method of Holding of Cables 20)

The movable arm 50 is molded in a state standing upward intersecting with the base part 60 during molding, as illustrated in FIGS. 3 to 6, and is rotated downward centered on the shaft hole 63 of the base part 60 to a state roughly in parallel with the base part 60 during use, as illustrated in FIG. 15.

In the state being rotated to roughly in parallel with the base part 60, the movable arm 50 is held stationary in that rotated state by friction resistance between the narrow-width insertion part 91 and the pair of shaft bearing pieces 62 of the base part 60.

Cables 20 are inserted as illustrated in FIG. 15 in the gap between the movable arm 50 in the raised position being rotated to roughly in parallel with the base part 60 and the free end part of the front end of the clamp part 70.

The cables 20 can be provisionally held by mounting on the inner perimeter surface of the clamp part 70, as illustrated in FIG. 15.

In order to hold the cables 20, the movable arm 50 is rotated downward centered on the shaft hole 63 of the base part 60, as illustrated in FIG. 2.

When the movable arm 50 is rotated downward, although not illustrated, the clamp part 70 is inserted into the guide slot 93 thereof.

Figure 13:
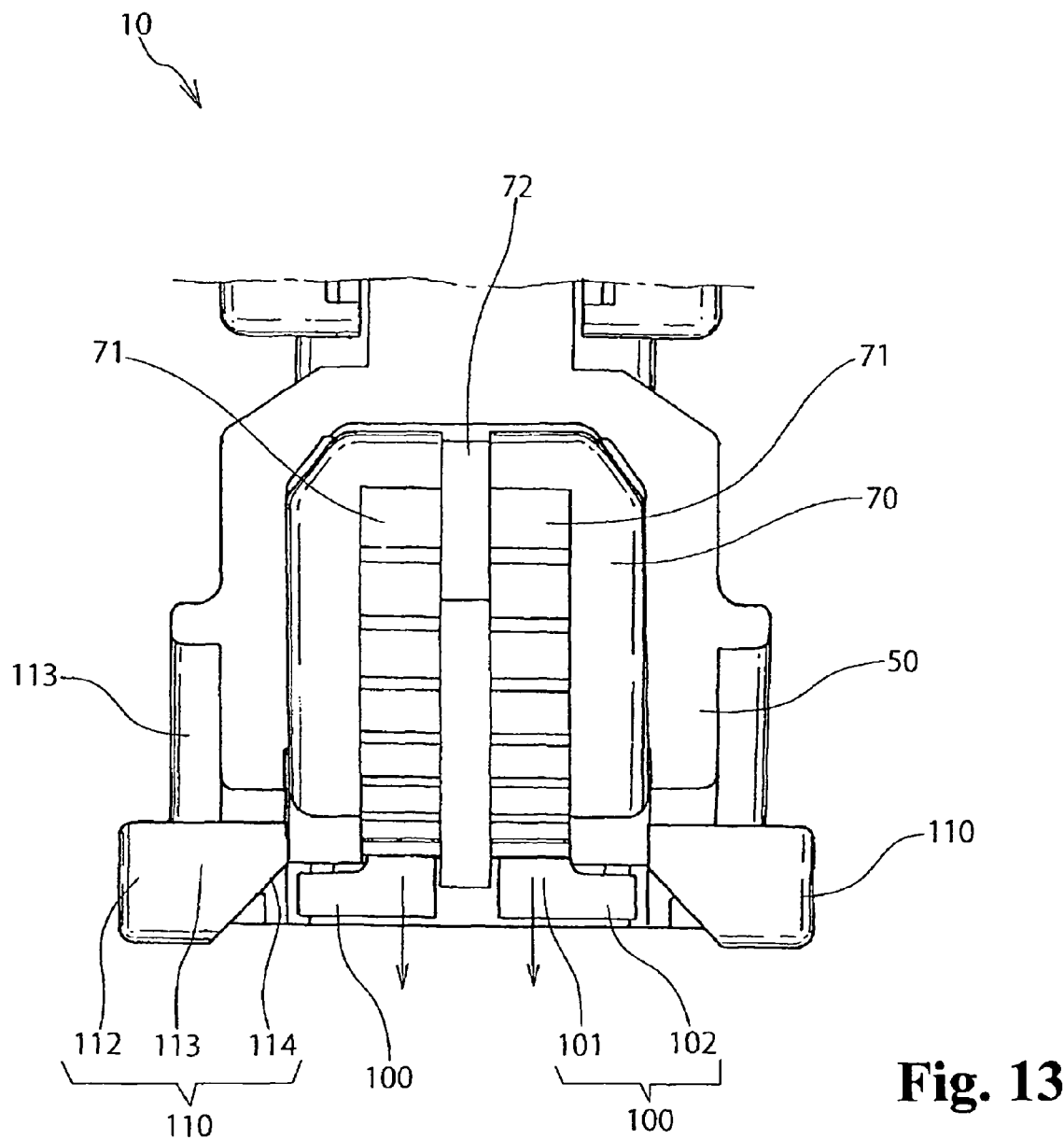
FIG. 13 is a partial side view of the cable clamp for describing the locked state between the clamp part and the movable arm part.
Figure 14:
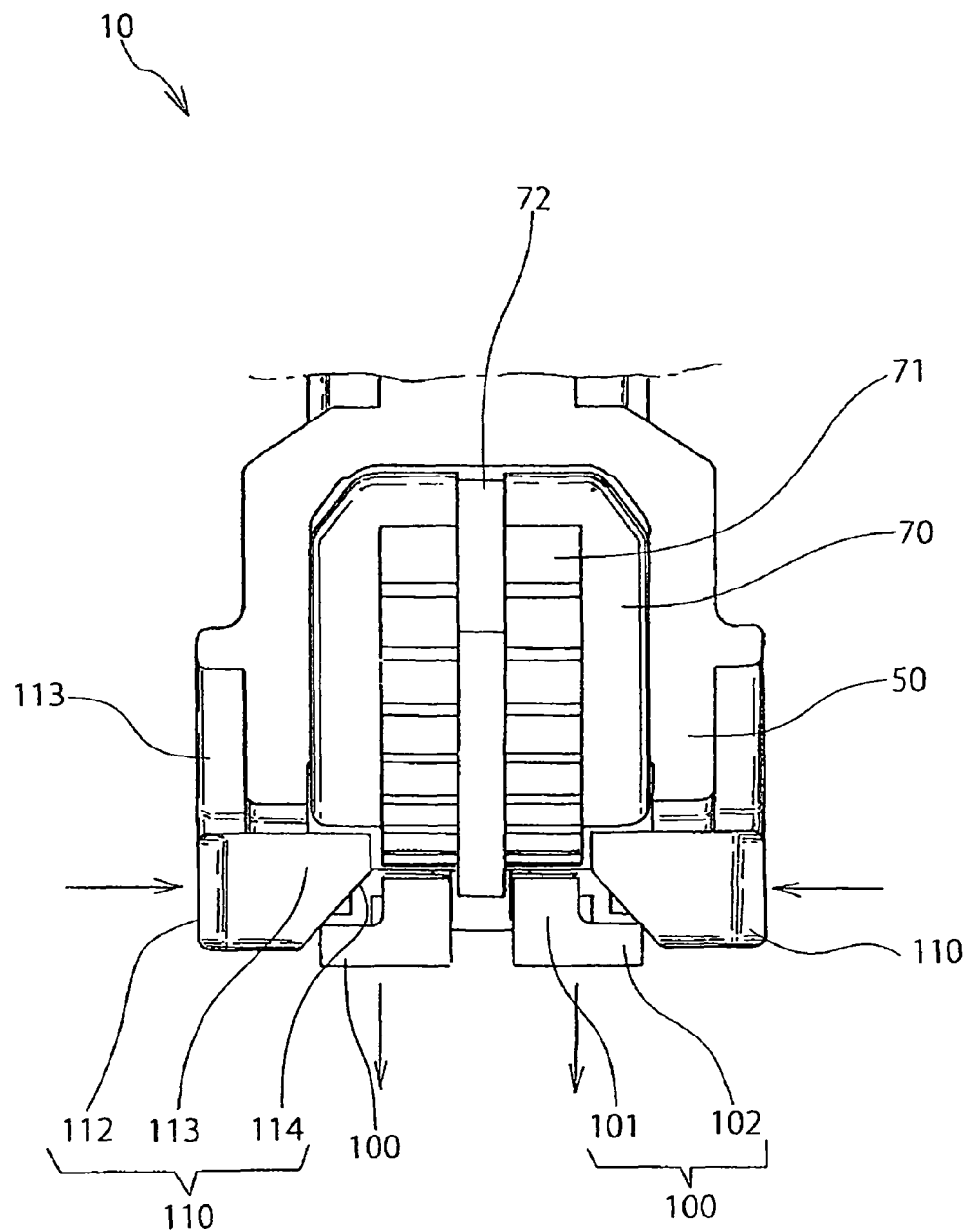
FIG. 14 is a partial side view of the cable clamp for describing a state of operation of the unlocking operating piece, corresponding to FIG. 13.

At this time, the locking claw part 101 of the elastic locking piece 100 projecting into the guide slot 93 couples with the sawtooth-form part 71 on the outer perimeter of the clamp part 70, as illustrated in FIGS. 11 to 13.

The locking claw part 101 is inserted into one of the indented parts 73 of the sawtooth-form part 71. When the movable arm 50 is rotated, the locking claw part 101 inserted into one of the indented part 73 comes up from the indented part 73 by coupling with the inclined surface of the projecting part positioned at the front in the advancing direction, rides past the projecting part 74 positioned at the front in the advancing direction, and is inserted into the next indented part 73. The movable arm 50 is rotated along the clamp part 90 by iteration of these steps.

When the movable arm 50 is rotated downward, the gap in the space formed with the clamp part 70 is closed by the cover part 90 thereof, and the cables 20 can no longer be removed.

When the movable arm 50 is rotated until contacting the cables 20 inside the clamp part 70, as illustrated in FIG. 2, and when the force of rotation is released, the locking claw part 101 is inserted into one of the indented parts 73 of the sawtooth-form part 71, whereby rotation in the reverse direction of the rotating arm 50 is checked.

The cables 20 are held in the space formed by the inner perimeter of the clamp part 70, the contact frame 120 of the movable arm 50, and the lower surface of the base part 60.

At this time, because the contact frame 120 is inclined diagonally, the cables 20 are held without gaps along the outer perimeters thereof, and rattling of the cables 20 inside the clamp part 70 can be prevented.

Also, at this time, a counterforce of the cables 20 acts on the movable arm 50, and the angular parts of the angular columnar projecting shaft 92 elastically contract on the edges of the square shaft hole 63, so that rattling of the two is prevented.

Specifically, although not illustrated, the counterforce acts due to the elastic return force of vinyl chloride or other insulating material covering the outer perimeter of the electrical wires in the cables 20.

(Method of Removal of Cables 20)

When removing the cables 20, the operating parts 112 of the pair of unlocking operating pieces 110 are pinched with fingers, and both unlocking operating pieces 110 are pushed inward in the direction of approaching each other, as illustrated in FIGS. 1 and 14.

When the unlocking operating piece 110 is pushed inward, the contact part 111 thereof contacts the extending part 102 of the elastic operating piece 100.

When the unlocking operating piece 110 is pushed further inward, the extending part 102 of the elastic locking claw 100 is pressed by the inclined surface 114 of the contact part 111, whereby the locking claw part 101 inserted in one indented part 73 of the sawtooth-form part 71 comes up from the indented part 73, and the locked state is unlocked.

Also, at this time, the inclined surface 114 of the contact part 111 is pressed against the extending part 102 of the elastic locking piece 100, and the connecting part 113 of the unlocking operating piece 110 is twisted. An elastic return force to return that twisting arises in the connecting part 113. The elastic return farce to return the twisting of the connecting part 113 acts as a counterforce on the extending part 102 of the elastic locking piece 100 by way of the inclined surface 114 of the contact part 111. The locking force to push the unlocking operating piece 110 inward can therefore be reduced by the elastic return force to return the twisting of the connecting part 113.

The movable arm 50 is rotated upward centered on the shaft hole 63 of the base part 60 in the state in which the unlocking operating piece 110 is pushed inward.

When the movable arm 50 is rotated upward, the free end part of the front end of the clamp part 70 escapes from inside the guide slot 93, and the gap in the space formed with the free end part is opened, as illustrated in FIG. 15.

The cables 20 can therefore be removed from the clamp part 70 through the opened gap.

The movable arm 50 is held stationary in the state being rotated parallel with the base part 60 by the friction resistance between the narrow-width insertion part 91 and the pair of shaft bearing pieces 62 of the base part 60.

Meanwhile, when the force pushing the unlocking operating piece 110 inward is released, the elastic locking piece 100 returns by the elastic return force of the connecting part 113, the elastic locking piece 100 also returns by the elastic return force of the connecting part 103, and the locking claw part 101 elastically projects into the guide slot 93 of the cover part 90.

While the invention has been explained with reference to the specific embodiments of the invention, the explanation is illustrative, and the invention is limited only by the appended claims.

The disclosure of Japanese Patent Application No. 2010-246543 filed on Nov. 2, 2010 is incorporated in the application.

What is claimed is:

1. A holding device for cables, comprising: a holder body adapted for holding a part, including a sawtooth-form part having a plurality of indented parts and projecting parts continuing on an outer side; an elastic locking piece attached to the holder body and having a locking claw part for locking said sawtooth-form part, said elastic locking piece locking the locking claw part in a locked state when said part is held in said holder body; an unlocking operating piece situated adjacent the locking claw part for unlocking the locked state between said sawtooth-form part and said locking claw part by contacting said elastic locking piece; wherein said sawtooth-form part is in the locked state when said locking claw part of said elastic locking piece enters said indented part of said sawtooth-form part; said elastic locking piece has an extending part extending to an outside from said locking claw part; said unlocking operating piece has a contact part for contacting said extending part; and said contact part is arranged such that When the unlocking operation piece is pressed, the contact part contacts the outside of said extending part, said locking claw part of said elastic locking piece is ejected from said indented part of said sawtooth-form part by said contact, and the locked state between said sawtooth-form part and said locking claw part is unlocked.

2. A holding device according to claim 1, wherein at least one of said extending part of said locking claw part and said contact part of said unlocking operating piece has an inclined surface.

3. A holding device according to claim 1, wherein at least one of said extending part of said locking claw part and said contact part of said unlocking operating piece has a curved surface.

4. A holding device according to claim 1, wherein a total length of said unlocking operating piece is longer than a total length of said elastic locking piece; and
   a front end side of said contact part of said unlocking operating piece contacts said extending part of said elastic locking piece.

5. A holding device according to claim 1, wherein said unlocking operating piece is arranged such that said contact part of said unlocking operating piece is twisted in a direction of unlocking of said elastic locking piece by contacting said elastic locking piece.

6. A holding device according to claim 1, wherein the holder body includes a clamp body having one end from which the sawtooth-form part extends, said elastic locking piece being rotationally attached to the clamp body to hold the part between the clamp body and the sawtooth-form part.

7. A holding device according to claim 6, further comprising support leg attached to the clamp body for attaching the holding device to another device.

* * * * *